United States Patent [19]

Ruckert

[11] Patent Number: 5,008,749

[45] Date of Patent: Apr. 16, 1991

[54] METHOD AND APPARATUS FOR GENERATING AN AUXILIARY TIMING SIGNAL IN THE HORIZONTAL BLANKING INTERVAL OF A VIDEO SIGNAL

[75] Inventor: Holger Ruckert, Reinheim, Fed. Rep. of Germany

[73] Assignee: BTS Broadcast Television Systems GmbH, Darmstadt, Fed. Rep. of Germany

[21] Appl. No.: 487,533

[22] Filed: Mar. 2, 1990

[30] Foreign Application Priority Data

Mar. 25, 1989 [DE] Fed. Rep. of Germany ....... 3909845

Mar. 25, 1989 [DE] Fed. Rep. of Germany ....... 3909847

[51] Int. Cl.[5] ......................... H04N 7/04; H04N 5/06

[52] U.S. Cl. ..................................... 358/147; 358/150

[58] Field of Search ............... 358/142, 146, 147, 150, 358/323, 319, 320, 337, 339, 148

[56] References Cited

U.S. PATENT DOCUMENTS

| | | | |
|---|---|---|---|
| 4,516,150 | 5/1985 | Gurley | 358/13 |
| 4,533,936 | 8/1985 | Tiemann et al. | 358/19 |
| 4,535,357 | 8/1985 | Penney | 358/150 |
| 4,814,875 | 3/1989 | Oldershaw | 358/150 |

FOREIGN PATENT DOCUMENTS 261291 11/1987 Japan .

*Primary Examiner*—John W. Shepperd

*Assistant Examiner*—Michael D. Parker

*Attorney, Agent, or Firm*—Frishauf, Holtz, Goodman & Woodward

[57] ABSTRACT

An auxiliary signal including a burst of oscillations and a blacker-than-black horizontal synchronizing signal is inserted in the horizontal blanking intervals of an HDTV video signal by first generating a digital auxiliary signal in a PROM operating at a clock frequency of 27 MHz. If the video signal from which the clock frequency and other control signals are derived is an analog video signal, the digital auxiliary signal is converted to an analog signal, filtered and clamped before it is additively combined with the analog video signal which has been similarly clamped. In that case the digital auxiliary signal stored in the PROM is predistorted so as to compensate for the damping effects of digital-to-analog conversion and low-pass filtering. When the video signal is available as a digital signal, the PROM outputs are clocked through a register enabled only in the horizontal blanking intervals and the digital video signal is clocked through a register disabled in the horizontal blanking intervals, so that the outputs of the registers can then go to a common digital-to-analog converter. In this case the PROM handles 9 bits, the most significant one of which goes to a MSB input of the digital-to-analog converter, to which the video signal has no connection, in order to produce the blacker-than-black synchronizing signal.

13 Claims, 4 Drawing Sheets

HDTV - VIDEO

1 CLAMP 14 15 + 16 Hc 9 PROM 11 D A 12 13 CLAMP CLK CLK Hc 8 COUN-TER CON-TROL 10 CLK CLK HD 3 PLL 7 Reset CLK CLK 2 4 5 AH 2V LOGIC CLK Hc 6

10 CYCLES
3,375 MHz
[V]
+0,7
100%
+0,35
50%
0
0%
-0,3
-43%

$U_v$
S
R
$U_h$
A $H_D$ $A_H$
A
H

10 OSCILLATIONS
3,375MHz

[V]
+0,7
100%
+0,35
50%
0
0%
-0,3
-43%
$P_v$
S
R
G
$P_n$
A

H $A_H$
A
H

METHOD AND APPARATUS FOR GENERATING AN AUXILIARY TIMING SIGNAL IN THE HORIZONTAL BLANKING INTERVAL OF A VIDEO SIGNAL

This invention concerns the generation of an auxiliary signal in the horizontal blanking interval of a video signal for facilitating the elimination of time-base errors that may arise, for example, in magnetic tape recording, especially in the case of HDTV video signals.

In the published German Patent Publication DE OS 37 36 741 of the assignee of this application, a system was disclosed for measuring time-base errors in a HDTV video signal reproduced from a magnetic tape, in which the HDTV video signal was provided with a reference signal in the region of the horizontal blanking interval which, like the color carrier synchronizing signal of a color television signal, consists of burst of a number of sinusoidal oscillations. In contrast to the color synchronizing signal, which is transmitted on a rear black shoulder of the horizontal synchronizing pulse, the reference signal is superimposed on a DC voltage of a medium gray value within the horizontal blanking interval. The frequency of the reference signal is locked to the frequency of a clock signal in accordance with the following relation $$f_{CLK}=f_{AUX}(2n+4) \text{ where } n=0,1,2,3\ldots$$

so that at a clock frequency of $f_{CLK}=27$MHz and where n=2, the frequency of the reference signal $f_{AUX}=3.375$MHz.

The clock signal of the frequency fCLK is, furthermore, frequency-locked with 864 times the horizontal scan frequency of a HDTV 1250 line video signal. A reference frequency oscillation which is added in the horizontal frequency blanking interval, which may be done in the recording portion of a magnetic tape recording and playback equipment for video signals, serves for determining time errors found in the reproduced HDTV video signal. The timing error is determined by reference to the phase position of the reproduced reference signal in a special phase detector.

SUMMARY OF THE INVENTION

It is an object of the present invention to provide in a method and system of the above-described kind to produce reference-oscillations of sinusoidal curve shape with great phase and amplitude accuracy and to add the reference oscillations together with a horizontal synchronizing signal as an auxiliary signal inserted into a video signal.

Briefly, during every horizontal frequency blanking interval an address signal is generated for a programmable read only memory (PROM) under control of a clock signal which is an integral multiple of the reference oscillation frequency and which is locked to the horizontal synchronizing signal of the video signal. The PROM stores the shape of the auxiliary signal and preferably also data for generating a synchronizing signal preceding the auxiliary signal. The PROM then contains a first memory portion storing the reference oscillations and a pedestal therefor, as less significant bits, and a second portion storing data for the synch pulse including a most significant bit designating a blacker than black level. The output signal of the PROM is converted from digital to analog form either before or after insertion into the video signal, according to whether the video signal is originally digital or analog and is separately low-pass filtered before insertion into the video signal in the horizontal frequency blanking interval when the video signal is an analog signal at the time of insertion.

In a one embodiment it is desirable for the low-pass filtering to be performed with a Bessel function low-pass filter having a cut-off frequency of about twice the frequency of the reference signal portion of the auxiliary signal.

It is advantageous for the contents of the PROM to provide pre-correction for the damping of the auxiliary signal in conversion from digital to analog form and in low-pass filtering when the conversion or filtering is performed prior to insertion of the auxiliary signal into the video signal. It is also desirable for the frequency of the clock signal to be locked to an even multiple of the reference frequency, preferably the 8-fold multiple.

In a preferred embodiment a first PROM is used for storing the reference oscillations for the auxiliary signal and a second PROM for a synchronizing pulse in the auxiliary signal, in which case the first PROM serves for the shaping of the reference oscillations and its output is put into a data stream of a digital video signal as the 8-bit data values of less significance. The data signal obtained from the second PROM to provide the synchronizing pulses is added in as the most significant data value when the data stream with its 8-bit insertions is converted from digital to analog form.

The corresponding apparatus of the present invention will be better understood in connection with an illustrated description that follows further below.

The method and system of the invention have the advantage that the digital and therefore highly precise generation of the auxiliary signal prior to recording reduces to a few nanoseconds the residual time errors that remain after correction of time errors during playback. The second embodiment has the advantage that the dynamic range of a digitalized video signal, established by 8-bit wide data words, does not need to be limited to an analog picture range from 0 volt for the black value to 0.7 volt for the white value, if supplementary synchronizing pulses having a negative amplitude of −0.3 volt are found necessary which lie outside the dynamic range of the 8-bit system.

BRIEF DESCRIPTION OF THE DRAWINGS

The invention will now be further described by way of illustrative examples with reference to the annexed drawings, in which.

Figure 1:
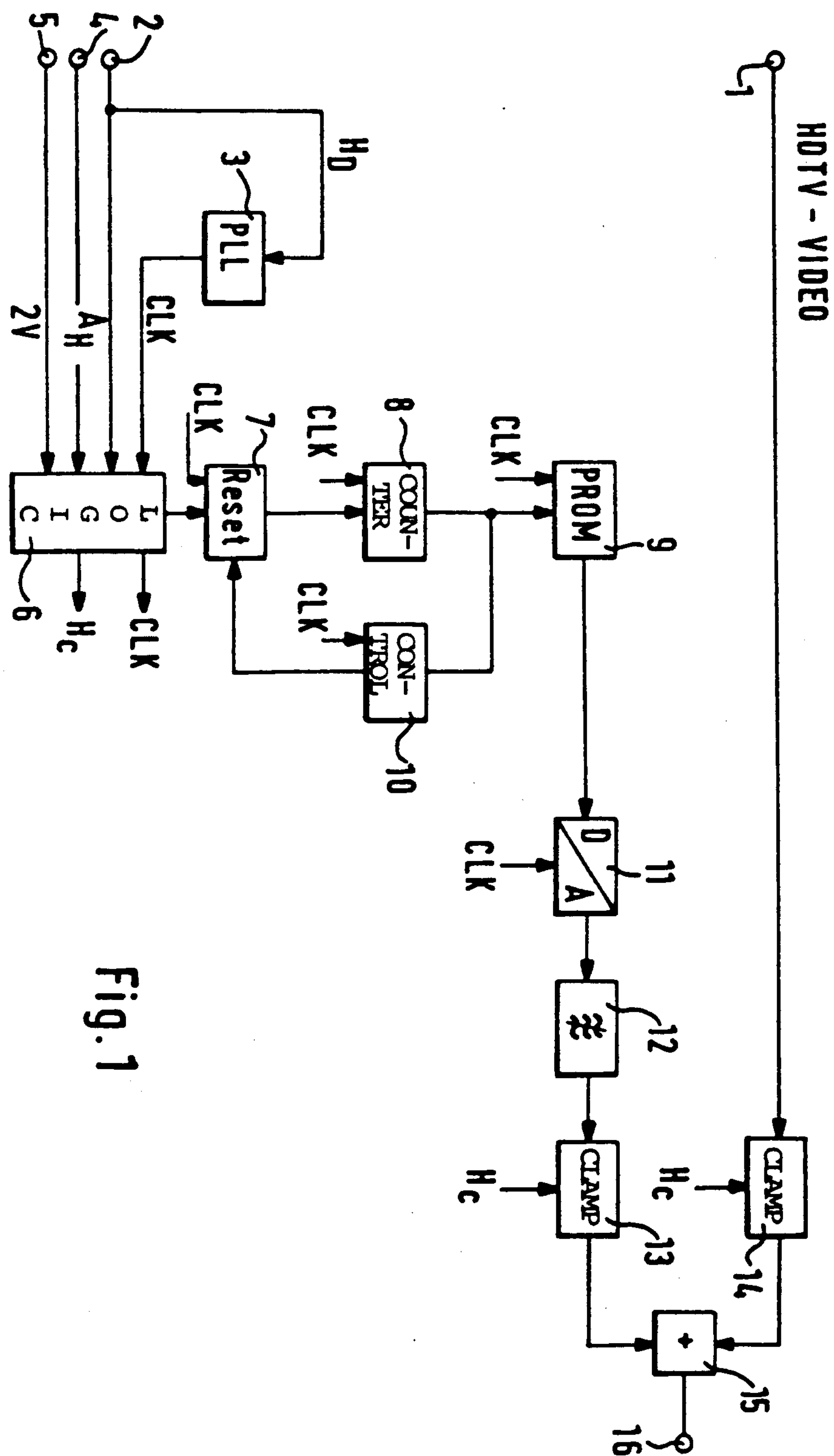
FIG. 1 is a block circuit diagram of a first embodiment of the invention.
Figures 2A, 2B, 2C, 2D, 2E:
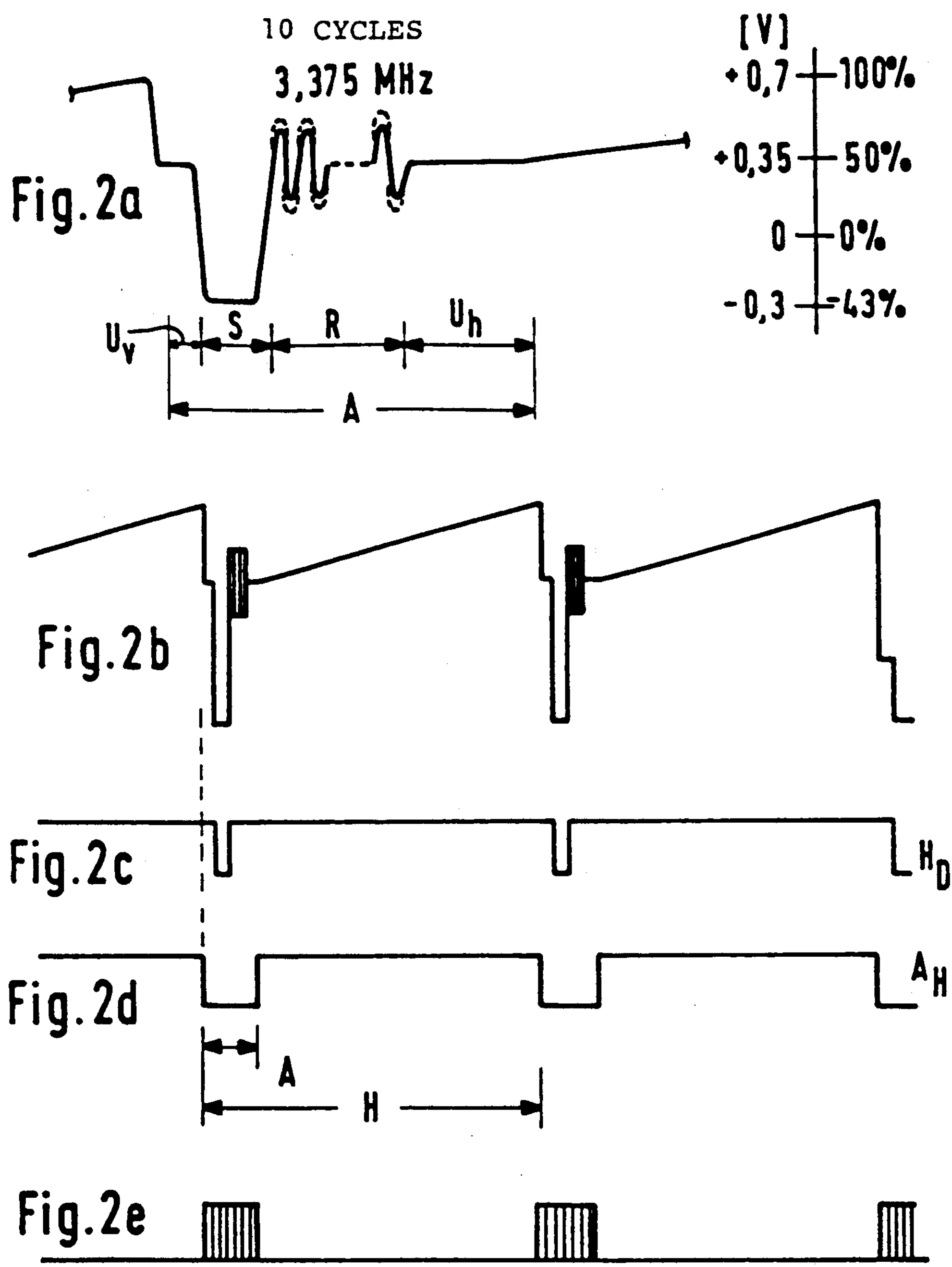
FIG. 2*a* is a graph of the auxiliary signal produced by the embodiment of FIG. 1 with a relative scale at the right and designations for various time intervals at the bottom.
FIGS. 2*b*, 2*c*, 2*d* and 2*e* are a set of timing diagrams to the same time scale making clear the operation of the circuit of FIG. 1.

DESCRIPTION OF THE ILLUSTRATED EMBODIMENTS:

At the terminal 1 shown in FIG. 1 the chrominance component of an analog video signal is supplied into which an auxiliary signal in the form of a negative synchronizing pulse S of a horizontal frequency synchronizing signal and a reference signal R provided on a gray level step are to be inserted in the horizontal blanking interval A. The reference signal R comprises 10 sinusoidal oscillations of a frequency of 3.375MHz. The video signal in the illustrated case is a HDTV video signal.

FIG. *2a* shows one of the horizontal frequency blanking intervals A containing a forward achromatic region $P_v$, a synchronizing pulse S, a reference signal R and a rear achromatic region $P_h$. The two achromatic regions $P_v$ and $P_h$ are at 50% of the picture amplitude range, which corresponds to 0.35 volt, since the picture voltage range from 0% to 100% extends from the 0 volt level to the 0.7 volt level, shown in the scale at the right of FIG. *2a*. The synchronizing pulses S of the synchronizing signal occupy an amplitude region from 0 volt to −0.3 volt of the aggregate amplitude range of one volt peak-to-peak.

As already mentioned the reference signal is to be locked in frequency and phase with the horizontal synchronizing signal of a HDTV video signal. For this reason a horizontal synchronizing signal $H_D$ (32μs per line period) transmitted in parallel with the analog video signal to a terminal 2 is supplied to a phase-locked loop 3, at the output of which a clock signal CLK having a clock frequency of 27MHz is made available which is locked in phase to the 864-multiple of the horizontal frequency of a HDTV video signal.

The clock signal CLK, as well as a horizontal blanking signal $A_H$ present at a terminal 4 and a vertical synchronizing signal 2V supplied at a terminal 5, are all combined into a control signal in a logic stage 6. The control signal is supplied through a reset stage 7 to the control inputs of an address counter 8. The outputs of the counter 8 are connected over a 9-bit wide address bus, on one hand, to the address inputs of a PROM 9 and, on the other hand, to a control stage 10. The control stage 10 detects an address value that is present at the end of the blanking interval, in order to reset, through the reset stage 7, the address counter 8 to a definite initial address value.

In the PROM 9 data words with the amplitude values of the curve shape of the auxiliary signal are stored at the appropriate addresses. In the illustrated case 8 amplitude values are stored in the PROM 9 for each oscillation period of the reference signal R. Furthermore data are stored in the PROM 9 for the curve shape of the horizontal frequency synchronizing pulse S and the two achromatic regions $P_v$ and $P_h$. In reading out the PROM 9 in response to a sequence of address signals the auxiliary signal is made available in the form of data words for further signal processing. These data words are then supplied over an 8-bit wide data bus to a digital to analog converter 11 where they are converted into corresponding analog values. The output of the digital to analog converter 11 is connected through a low-pass filter 12 with a clamping stage 13, which clamps the now analog auxiliary signal to a definite DC voltage potential in the rear achromatic region $P_h$ by means of a horizontal frequency clamping pulse signal $H_C$. Another clamping stage 14 is inserted in the transmission channel provided for transmitting the HDTV video signal.

The signals made ready at the outputs of the clamping stages 13 and 14 are added together in an addition stage 15, so that at an output terminal 16 an HDTV video signal is made available into the horizontal blanking intervals of which an auxiliary signal is inserted which is highly precise with reference to its phase and amplitude values.

A clock signal CLK prepared in the logic stage 6 is supplied to the reset stage 7, the address counter 8, the PROM 9, the control stage 10 and the digital to analog converter 11.

The digital to analog converter 11 has an amplitude damping characteristic that conforms to $$\frac{\text{sine } x}{x}$$

function

The low-pass filter 12 which follows the converter 11 likewise has a certain amplitude-damping characteristic which in the illustrated example falls off towards higher frequencies in accordance with a Bessel function. The cut-off frequency of the low-pass filter 12 constituted as a Bessel low-pass filter lies at about 6MHz, thus about twice as high as the frequency of 3.375MHz of the oscillatory portion of the auxiliary signal, which may be referred to for short as the frequency of the auxiliary signal. By the choice of such a high cut-off frequency compared to the frequency of the auxiliary signal, the group propagation time errors of the Bessel low-pass filter can be treated as negligible. Means for correction of group velocity errors can therefore be left out, particular since practically only a single frequency is to be transmitted.

The amplitude-damping losses produced by the digital-to-analog converter 11 and the low-pass filter 12 can be compensated by providing correspondingly "predistorted" amplitude values in the data words stored in the PROM 9.

The broken line signal curve of the reference signal R in FIG. *2a* is intended to show this compensation procedure. The voltage/time diagram of FIG. *2b*, on a different time scale, shows two complete line periods H of the analog video signal provided at the terminal 1. The timing diagrams shown in FIGS. *2c* and *2d* respectively show voltage/time diagrams of the horizontal synchronizing signal $H_T$ and of the horizontal blanking signal $A_H$. The address signal, as shown in FIG. *2e*, appears only during horizontal frequency blanking intervals A, during which intervals it is applied to the address inputs of the PROM 9.

By virtue of the digital derivation of the auxiliary signal which includes the reference oscillation signal and the horizontal synchronizing signal and the resulting fixed time relation between defined sampling instants in the auxiliary signal that is generated a signal shape is provided that is essentially independent of the manufacturing tolerances of analog circuit components. In consequence there is no effect on the phase position and the amplitude course of the generated auxiliary signal resulting from the unavoidable variations between mass produced components of the same type.

Figure 3:
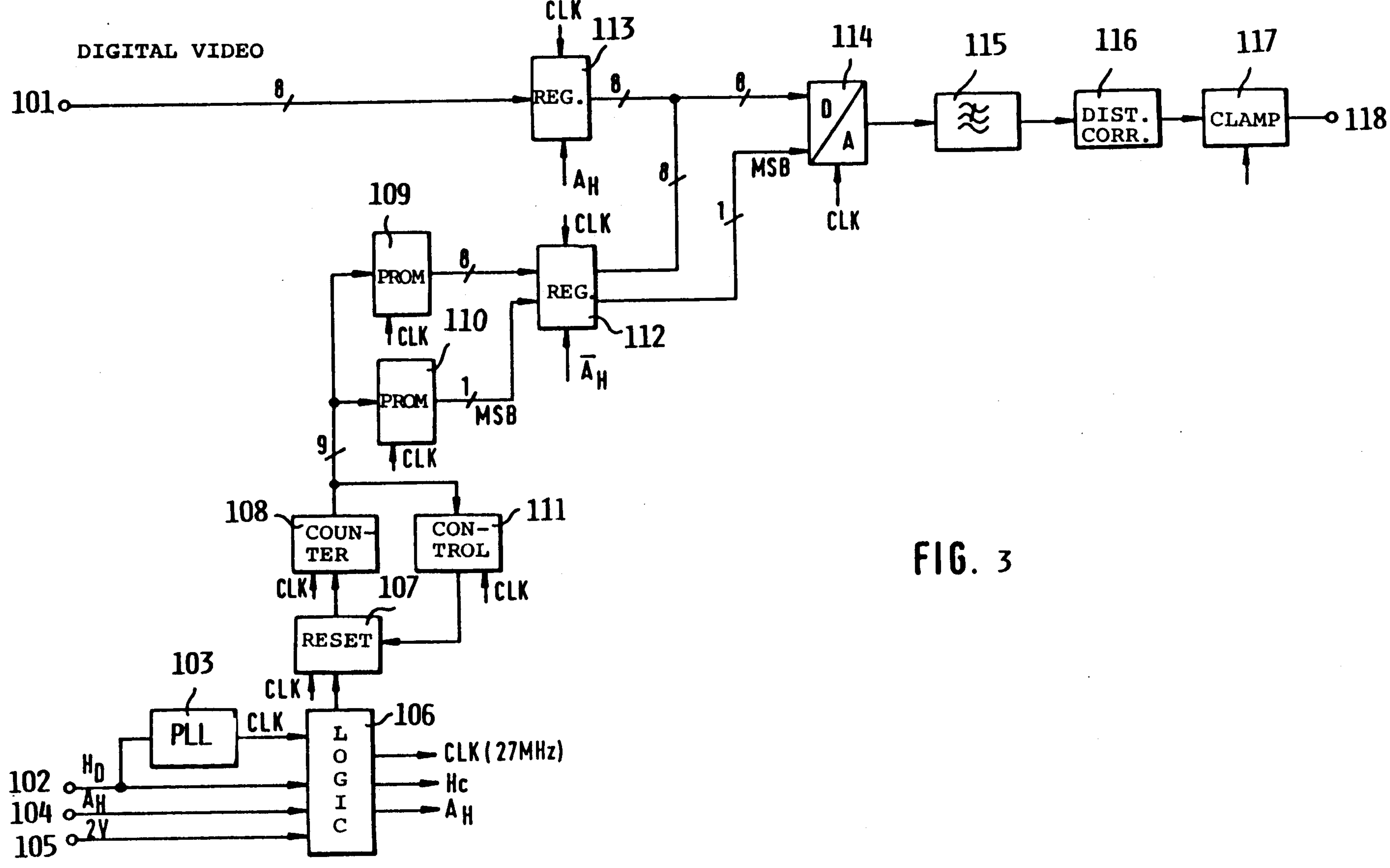
FIG. 3 is a block circuit diagram of a second embodiment of the invention.

In the block circuit diagram of FIG. 3, relating to a second embodiment of the invention, the video signal at the input terminal 1 is a digital video signal with a word width of 8 bits. Again, in the horizontal frequency blanking interval A of this digital video signal an auxiliary signal, comprising negative synchronization pulses S of a horizontal frequency synchronizing signal and reference oscillations R on a gray pedestal G, is to be inserted. The reference oscillations R are sinsusoidal oscillations of a frequency of 3.375MHz.

Figure 4A:
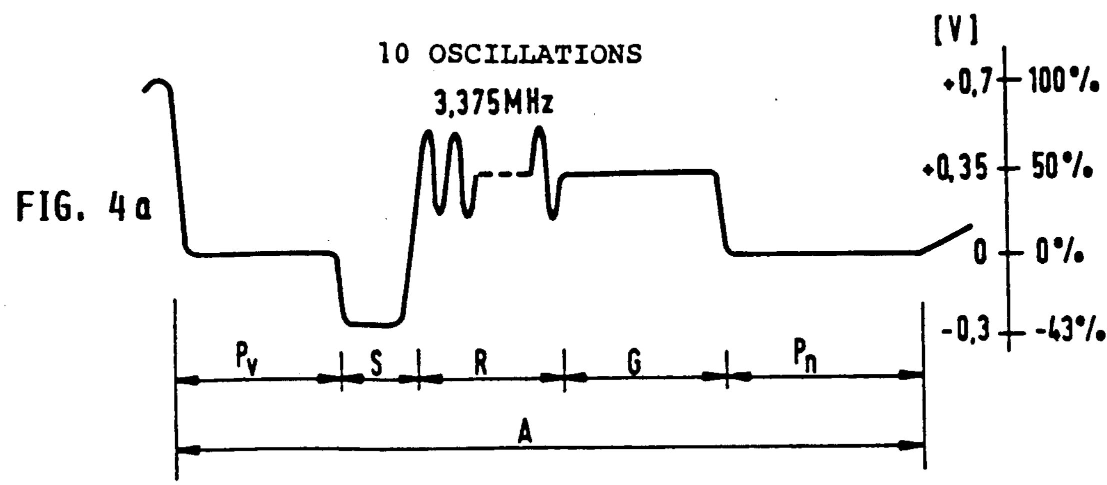
FIG. 4*a* is a graph similar to that of FIG. 2*a*, but referring to the embodiment of FIG. 3, and FIGS. 4*b*, 4*c* and 4*d* are timing diagrams to the same time scale for making clear the operation of the embodiment of FIG. 3.

FIG. 4*a* shows one of the horizontal blanking intervals A with a region for a forward black shoulder $P_v$, a synchronizing pulse S, a reference signal R, a gray pedestal G and a rear black shoulder $P_n$. The gray pedestal G is again at 50% of the picture amplitude, which is a level of 0.35, volt and the picture range corresponding to the 0 volt to 0.7 volt levels is shown on a percentage scale at the right. The sync pulses S of the synchronizing signal occupy an amplitude range, again, from 0 volt to −0.3 volt.

The reference oscillations and their frequency are, again, locked in frequency and phase to the synchronizing signal of a HDTV video signal.

In a manner similar to FIG. 1 a horizontal synchronizing signal $H_D$ is supplied to a terminal 102 from which it proceeds to a phase locked loop 103 and to a logic circuit 106. A horizontal blanking signal $A_H$ and a vertical blanking signal 2V are respectively supplied through terminals 104 and 105 to the logic circuit 106 where they are combined to provide a control signal which is supplied to a reset circuit 107. Again the phase locked loop 103 produces a clock signal CLK of a clock frequency of 27MHz which is locked in phase to an 864-multiple of the horizontal frequency of a HDTV video signal. The address counter 108 and the control circuit 111, as well as the reset circuit 107 operate in the same manner as the corresponding components of FIG. 1.

In this case a 9-bit wide output of the address counter 108 addresses two PROMs 109 and 110. The PROM 109 provides an 8-bit wide output defining the waveshape of the 10-cycle burst of reference frequency sinusoidal oscillations. The second PROM 110 provides a one-bit sync signal output which is the most significant bit of the combination of the outputs of the PROMs 9 and 10, both of which outputs go to a register 12 which is enabled by the inverse $A_H$ of the horizontal blanking signal and is clocked by the clock signal CLK. The digital video signal is also clocked through a register, in this case the register 113, which is enabled by the horizontal blanking signal $A_H$. The 8 less significant bits clocked out of the register 112 and the 8-bits clocked out of the register 113 (which do not overlap in time and can form a single stream) are combined to provide the 8 least significant bits for the digital to analog converter 114, to which the most significant bit is supplied from the register 112 to define the negative-going horizontal synchronizing pulse.

The output of the digital to analog converter 114 is passed through the low-pass filter 115, a distortion compensation stage 116 and a clamping stage 117 which clamps the now analog video signal with a horizontal frequency clamping pulse $H_C$ in the region of the forward black shoulder $P_v$ to a definite the d.c. signal base level.

In this case the low-pass filter 115 is a 7−pole Tschebyscheff filter having a linear frequency characteristic up to about 10.5MHz. The distortion compensation stage 116, by means of a passive frequency characteristic that rises towards the cut-off frequency, compensates for the amplitude damping losses produced in the analog to digital converter 114 and the low-pass filter 115. At the output of the clamping stage 117 an analog video signal is made available which contains, in the region of the horizontal blanking interval, as shown in FIG. 4*a*, a synchronizing pulse S, the reference signal R and the gray pedestal G.

Figure 4B:
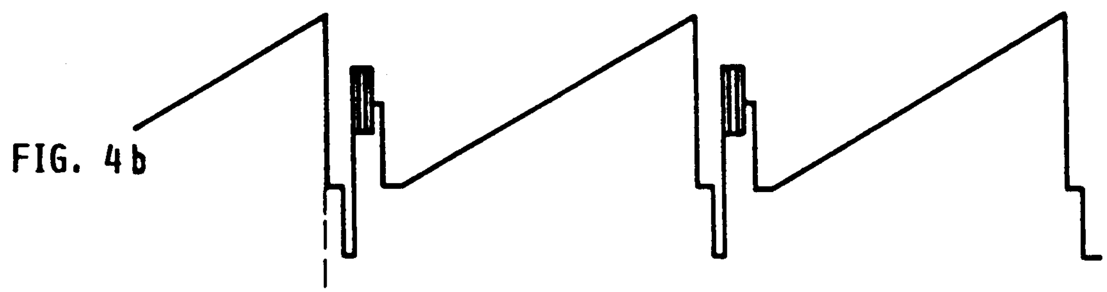
Figure 4C:
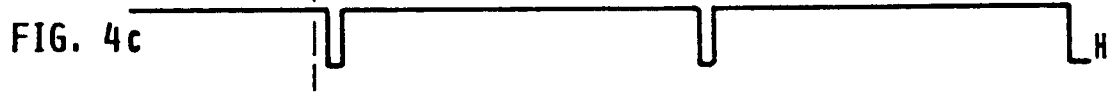
Figure 4D:
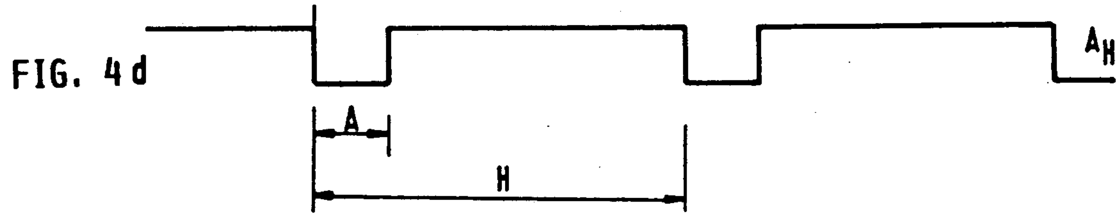

FIG. 4*b* shows, on a different time scale, two complete horizontal periods of the video signal output of the circuit of FIG. 3 at the terminal 118. On the same time scale FIG. 4*c* shows a horizontal synchronizing signal H and FIG. 4*d* shows a horizontal blanking signal $A_H$ defining a blanking interval A and a line period H.

With either the embodiment of FIG. 1 or the embodiment of FIG. 3, the residual errors remaining after a timing error correction on the playback side of a recording and playback magnetic tape equipment for HDTV recording and playback can be limited to about 3 nanoseconds. This corresponds to about one-sixth of a pixel in a HDTV video signal.

Although the invention has been described with reference to a particular illustrative examples, it will be understood that variations and modifications are possible within the inventive concept.

I claim:

1. A method of generating an auxiliary signal for use in recording or transmission of a video signal in order to make timing errors in playback or reception more accurately correctable, comprising the steps of:

deriving a clock signal ($f_{CLK}$) which is locked to the horizontal scan frequency of said video signal and has a frequency suitable for being an integral multiple of a reference frequency intended to be characteristic of said auxiliary signal;

during every horizontal blanking interval of said video signal, generating in step with said clock signal an address signal and addressing therewith a read-only memory in which is stored said auxiliary signal, including several oscillations of said reference frequency and also data for generating a synchronizing pulse preceding said several oscillations, to produce said auxiliary signal while said memory is clocked by said clock signal, said read only memory including first memory means for storing, as less significant bits of said memory, said reference frequency oscillations and a pedestal therefor and second memory means for storing said synchronizing pulse in a form providing a most significant bit representing a synchronizing pulse which is a blacker-than-black pulse with reference to the luminance of said video signal, and inserting said auxiliary signal into said video signal during each horizontal blanking interval.

2. The method of claim 1, wherein said memory is programmed so that said clock frequency is an even multiple of said reference frequency.

3. The method of claim 1, wherein said memory is so programmed that said clock frequency is the 8-fold multiple of said reference frequency.

4. The method of claim 1, wherein said video signal is a digital video signal and wherein said less significant bits from said first memory means are inserted in the digital data stream of said video signal and thereafter said video signal data stream is converted from digital-to-analog form in a converter to which said most significant bit of said second memory means is supplied as the most significant bit for said digital-to-analog conversion, and wherein the resulting analog video signal containing said auxiliary signal is filtered and clamped after the digital-to-analog conversion.

5. The method of claim 4, wherein said filtering includes a Tschebyscheff filter, having a linear frequency characteristic rising to a frequency greater than twice said reference frequency, and at least one following stage for compensation of the damping effect of digital-to-analog and low-pass filtering steps.

6. A method of generating an auxiliary signal for use in recording or transmission of an analog video signal in order to make timing errors in playback or reception more accurately correctable, comprising the steps of:

deriving a clock signal ($f_{CLK}$) which is locked to the horizontal scan frequency of aid video signal and has a frequency suitable for being an integral multiple of a reference frequency intended to be characteristic of said auxiliary signal;

during every horizontal blanking interval of said video signal, generating in step with said clock signal an address signal and addressing therewith a read-only memory in which is stored said auxiliary signal, including several oscillations of said reference frequency to produce and store said auxiliary signal, while said memory is clocked by said clock signal;

converting said auxiliary signal from digital to analog form, then low-pass filtering said converted auxiliary signal, and then inserting said auxiliary signal into said video signal during each horizontal blanking interval by additive combination therewith.

7. The method of claim 6, wherein prior to the step of additive combination for insertion of said auxiliary signal into said video signal, said auxiliary signal and, likewise, said video signal are clamped to a predetermined d.c. level by a clamping pulse provided during each said horizontal blanking interval.

8. The method claim 6, wherein said memory is programmed so that said oscillations of said reference frequency will have a time course which includes precompensation for damping effects of said low-pass filtering and of said conversion from digital to analog form.

9. The method of claim 6, wherein said low-pass filtering is performed with a Bessel low-pass filter having a cut-off frequency of about twice said reference frequency.

10. Apparatus for inserting an auxiliary signal into the horizontal blanking intervals of an analog video signal, said auxiliary signal including reference oscillations at a frequency locked to a clock frequency itself locked to the horizontal scan frequency, comprising:

means (3) for deriving a signal (CLK) of said clock frequency from said horizontal scan frequency of said video signal;

means (6, 7, 8, 10) activated by said clock frequency signal (CLK) only during said blanking intervals, responsive to said clock frequency signal (CLK), a horizontal blanking interval signal ($A_H$) and a vertical synchronizing signal (2V) both derived from said video signal, for producing a sequence of address signals in each of said horizontal blanking intervals;

read only memory means (9) responsive to said address signals for generating a digital signal representative of said auxiliary signal;

means (11) for converting said digital signal representative of said auxiliary signal into an analog signal;

means (12) for low-pass filtering said analog signal to produce said auxiliary signal, and means (15) for inserting said auxiliary signal into the horizontal blanking intervals of said analog video signal.

11. The apparatus of claim 10, wherein said means for inserting said auxiliary signal into the horizontal blanking intervals of said analog video signal comprise signal addition means having a first input for said analog video signal and a second input for said auxiliary signal, a first clamping stage having an input for said analog video signal and an output connected with said input of said addition means and a second clamping stage having an input for receiving said auxiliary signal and an output connected to said second input of said addition means, and means for providing a clamping pulse ($H_C$) of horizontal scan frequency and for applying the same to said first and second clamping means.

12. Apparatus for inserting an auxiliary signal into the horizontal blanking intervals of a digital video signal, said auxiliary signal including reference oscillations at a frequency locked to a clock frequency itself locked to the horizontal scan frequency of said video signal comprising:

means (103) for deriving a signal (CLK) of said clock frequency from said horizontal scan frequency of said video signal;

means (106, 107, 108, 110) activated by said clock frequency signal (CLK) only during said blanking intervals, responsive to said clock frequency signal (CLK), a horizontal blanking interval signal ($A_H$) and a vertical synchronizing signal (2V) both derived from said video signal, for producing a sequence of address signals in each of said horizontal blanking intervals;

read-only memory means (109) responsive to said address signals generating a digital signal representative of said auxiliary signal, said memory means including a first memory portion for producing 8 less significant bits defining a portion of said auxiliary signal consisting of said reference oscillations and a pedestal therefor and a second memory portion providing a most significant bit output for defining the remainder of said auxiliary signal, including a horizontal synchronizing signal;

digital-to-analog conversion means having an analog output, eight less significant bit inputs connected both to a source of said digital video signal and to said less significant bit outputs of said first memory portion and a most significant bit input connected to said most significant bit output of said second memory portion;

means (115, 116) for filtering said analog output of said conversion means, and means for clamping the output of said filtering means for fixing the d.c. level of said output and including means for providing horizontal frequency clamping pulses, derived from said digital video signal, for controlling said clamping means.

13. The apparatus of claim 12, wherein the outputs of said read-only memory means (109, 110) pass through a first register interposed between said memory means and digital-to-analog converter and a second register is provided which is interposed between said source of said digital video signal and said less significant inputs of said digital to analog conversion means, both said first and second registers being connected for being clocked by said clock frequency signal (CLK), said first register being enabled during said horizontal blanking intervals and said second register being enabled in the absence of said horizontal blanking intervals respectively by means for supplying a horizontal blanking signal inversely applied to said first register and directly applied to said second register.

* * * * *